United States Patent
Medvinsky (10) Patent No.: US 7,376,837 B1
(45) Date of Patent: May 20, 2008

(54) BUILT-IN MANUFACTURER'S CERTIFICATES FOR A CABLE TELEPHONY ADAPTER TO PROVIDE DEVICE AND SERVICE CERTIFICATION

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/296,846

(22) PCT Filed: Apr. 7, 2000

(86) PCT No.: PCT/US00/09318

§ 371 (c)(1),
(2), (4) Date: Oct. 3, 2003

(87) PCT Pub. No.: WO00/62519

PCT Pub. Date: Oct. 19, 2000

Related U.S. Application Data (60) Provisional application No. 60/128,772, filed on Apr. 9, 1999.

(51) Int. Cl.
*G06F 1/24* (2006.01)
(52) U.S. Cl. .................. 713/175; 713/168; 713/173
(58) Field of Classification Search ............... 713/168, 713/173, 175
See application file for complete search history.

(56) References Cited

U.S. PATENT DOCUMENTS 5,867,495 A  2/1999  Elliott et al.

OTHER PUBLICATIONS

CISCO; "Cisco Announces New Cable Broadband Access Product to Support Integraded Data, Voice and Video"; available on internet <URL:HTTP://CIO.CISCO.COM/WARP/PUBLIC/146/PRESSROOM/1999/JAN99/10.HTML>; Jan. 1, 1999; XP002147934.
Nortel Networks; "IP Telephony"; Cablenet '98; 1998; XP002147949; available on the internet <URL:http://www.cablenet.org/CN98/apps/Nort_teleph_col.pdf>; 1998.
Cehri Paquet; "Motorola Announces IP Telephony via Cable Networks"; Computerworld, May 5, 1998; XP002147950; available on the internet <URL:http://www.cw.com.hk/Analysis/a980506001.htm>.

*Primary Examiner*—Thomas R. Peeso
(74) *Attorney, Agent, or Firm*—Larry T. Cullen (57) ABSTRACT

System for using a manufacturer issued certificate to authenticate a CTA device during registration with an IP telephony network. In response to providing the manufacturer issued certificate, the issuance of another certificate allows the CTA to be provisioned by a specific IP telephony network. The system includes a method of operating a cable telephony adapter in an IP telephony network. The method includes steps of storing a manufacturer issued certificate in the cable telephony adapter, providing the manufacturer issued certificate to the telephony network, receiving a network issued certificate, and registering for telephony services with the telephony network using the network issued certificate.

5 Claims, 11 Drawing Sheets

BUILT-IN MANUFACTURER'S CERTIFICATES FOR A CABLE TELEPHONY ADAPTER TO PROVIDE DEVICE AND SERVICE CERTIFICATION

CROSS-REFERENCES TO RELATED APPLICATIONS

This application claims priority from co-pending U.S. Provisional Patent Application 60/128,772 (hereinafter "'772") filed on Apr. 9, 1999, the disclosure of which is incorporated in its entirety herein for all purposes.

FIELD OF THE INVENTION

This invention relates generally to the field of network telephony, and more particularly, to a system for registering a telephony device with a telephony network.

BACKGROUND OF THE INVENTION

In IP telephony systems, a cable telephony adapter (CTA) device is used to allow a user to send and receive information in secure transactions over an IP telephony network. In typical operation, a series of signaling messages are exchanged that register the CTA device with the IP telephony network before a secure channel with another user can be established.

Therefore, there is a need to authenticate the CTA device. The authentication provides protocol security and allows the IP telephony network to authenticate the identity of the CTA device. The CTA should be authenticated from the very beginning of the provisioning process. Otherwise the provisioning process would be open to additional denial of service attacks—since some provisioning exchanges can be forged. In addition, it is desirable for the service provider to cryptographically identify the CTA device—to make sure that only authorized devices are allowed in its IP Telephony network. If only the subscriber—but not the CTA device itself—were authenticated, this would not be possible.

SUMMARY OF THE INVENTION

The present invention includes a system for using a manufacturer issued certificate to authenticate a CTA device during registration with an IP telephony network. In response to providing the manufacturer issued certificate, the issuance of another certificate allows the CTA to authenticate itself with a specific IP telephony network. As a result, the IP telephony network does not need to keep track of CTA hardware identifiers when outside of the provisioning system.

In one embodiment of the present invention a method of operating a cable telephony adapter in an IP telephony network is provided. The method includes steps of storing a manufacturer issued certificate in the cable telephony adapter, providing the manufacturer issued certificate to the telephony network, receiving a network issued certificate, and registering for telephony services with the telephony network using the network issued certificate.

In another embodiment of the present invention a cable telephony adapter for interfacing a user to a telephony network is provided. The cable telephony adapter includes a telephony network interface having logic to couple to the telephony network and a user interface having logic to couple to a user device. The cable telephony adapter also includes a cryptographic module having logic to store a manufacturer issued certificate and a processor coupled to the telephony network interface and the cryptographic module, and having logic to use the manufacturer issued certificate to obtain a network issued certificate.

A further understanding of the nature and the advantages of the inventions disclosed herein may be realized by reference to the remaining portions of the specification and the attached drawings.

DESCRIPTION OF THE SPECIFIC EMBODIMENTS

Figure 1:
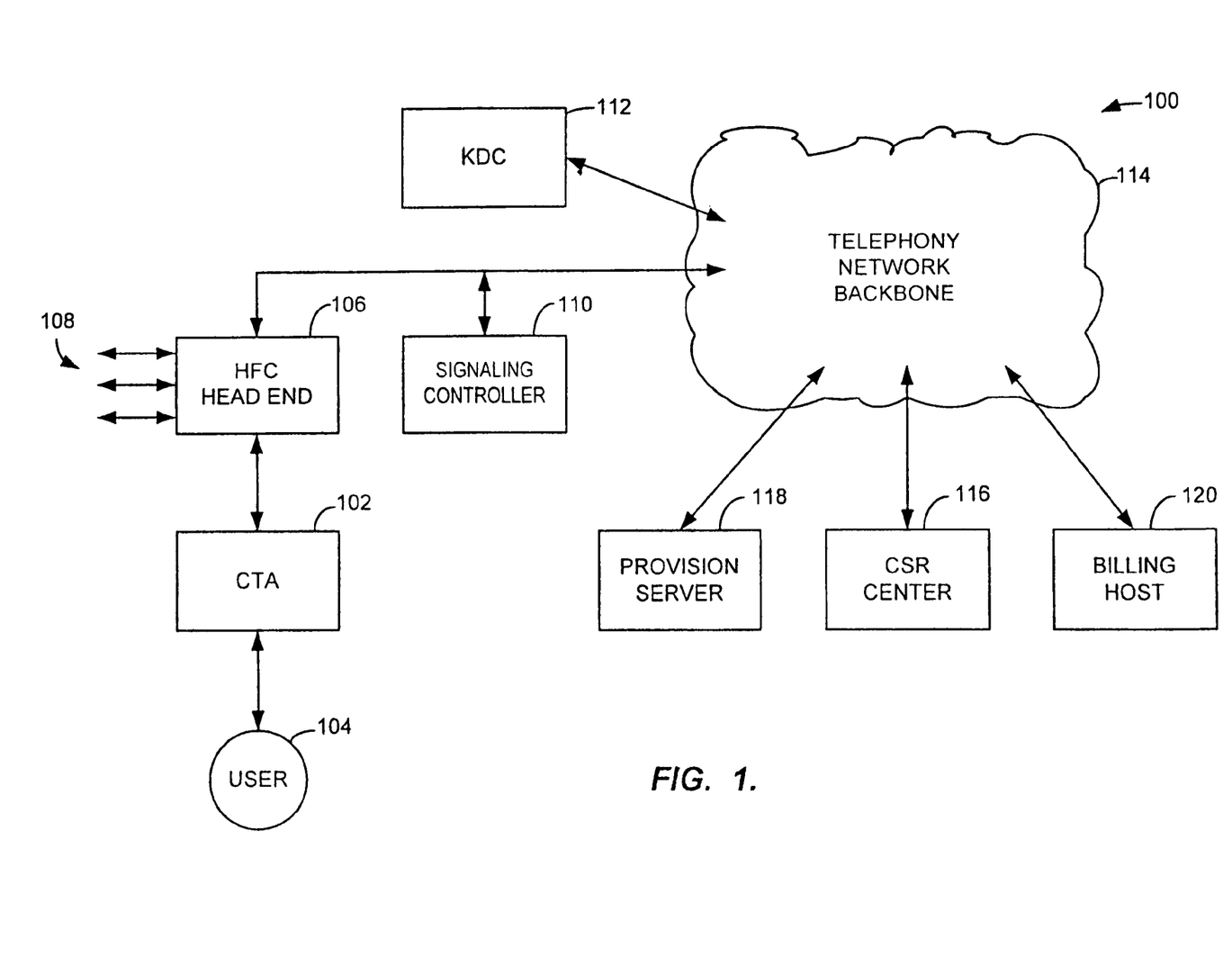
FIG. 1 shows a portion of a telephony network including a CTA containing a manufacturer issued certificate in accordance with the present invention.

FIG. 1 shows a portion of a telephony network 100 including a CTA 102 containing one or more manufacturer issued certificates in accordance with the present invention. The CTA 102 provides access to a user 104 via a hybrid fiber/coax (HFC) head-end 106. The HFC head-end 106 has the capacity to provide access to other users as shown at 108. The HFC head-end is also coupled to a Signaling Controller (SC) 110, used to control the CTA's access to the telephony network. A key distribution center (KDC) 112 issues Kerberos tickets, which are in turn used to generate sub-keys for secure connection protocols, such as the Internet protocol security (IPSec) encapsulating security payload (ESP) protocol, or other secure connections. The network 100 also includes a customer service representative (CSR) center 116, a provisioning certification authority (CA) 118 and a billing host 120. Thus, in the network 100 it is possible for the user 104 to access the telephony backbone 114 via the CTA 102 using a secure protocol.

Figure 2:
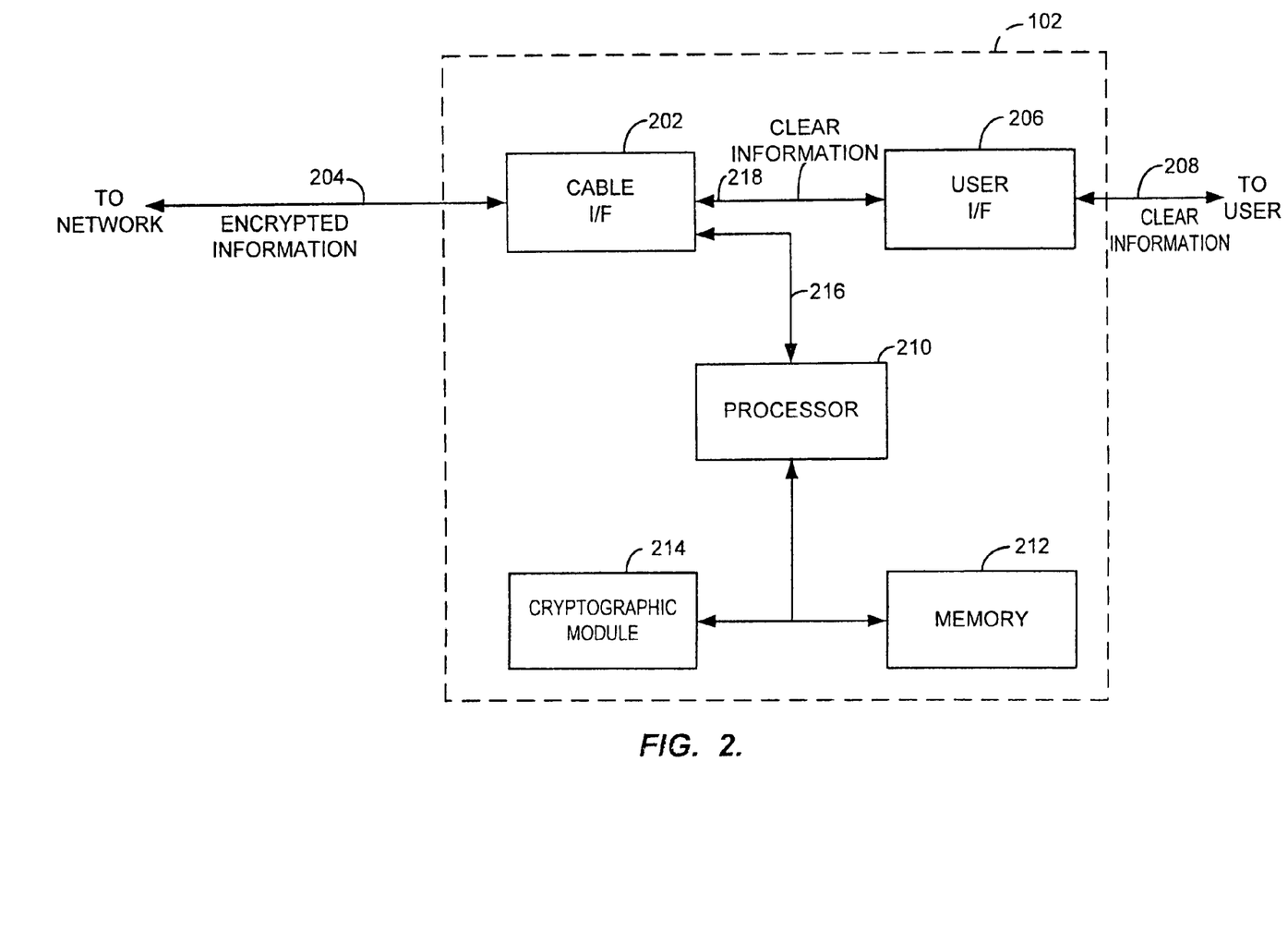
FIG. 2 shows an exemplary embodiment of a CTA constructed in accordance with the present invention.

FIG. 2 shows an exemplary embodiment of the CTA 102 constructed in accordance with the present invention. The CTA 102 includes a cable interface (I/F) 202 which can be coupled to the telephony network at 204, and a user I/F 206 which can be coupled to a user at 208. The CTA 102 also includes a processor 210, a memory 212 and a cryptographic module 214.

The processor 210 is coupled to the cable I/F 202, as shown at 216, to provide decryption and encryption of information received and transmitted on the telephony network. As a result, the connection to the telephony network at line 204 carries secure encrypted information, while a connection between the cable I/F and the user I/F, as shown at line 218, carries unencrypted information. The unencrypted information is commonly referred to as clear information and extends back to the user on line 208.

The cryptographic module 214 is coupled to the processor module 210 and includes a public/private key pair that may be used to provide secured encrypted communication between the CTA 102 and the telephony network. The cryptographic module also includes a permanent device ID that is provided by the manufacturer that can be used to identify the device. This permanent device ID and the public key are embedded inside the manufacturer issued CTA certificate. The processor 210 can access the memory 212 to store CTA operating parameters, received telephony network parameters, or other cryptographic information used during operation of the CTA.

Figure 3A:
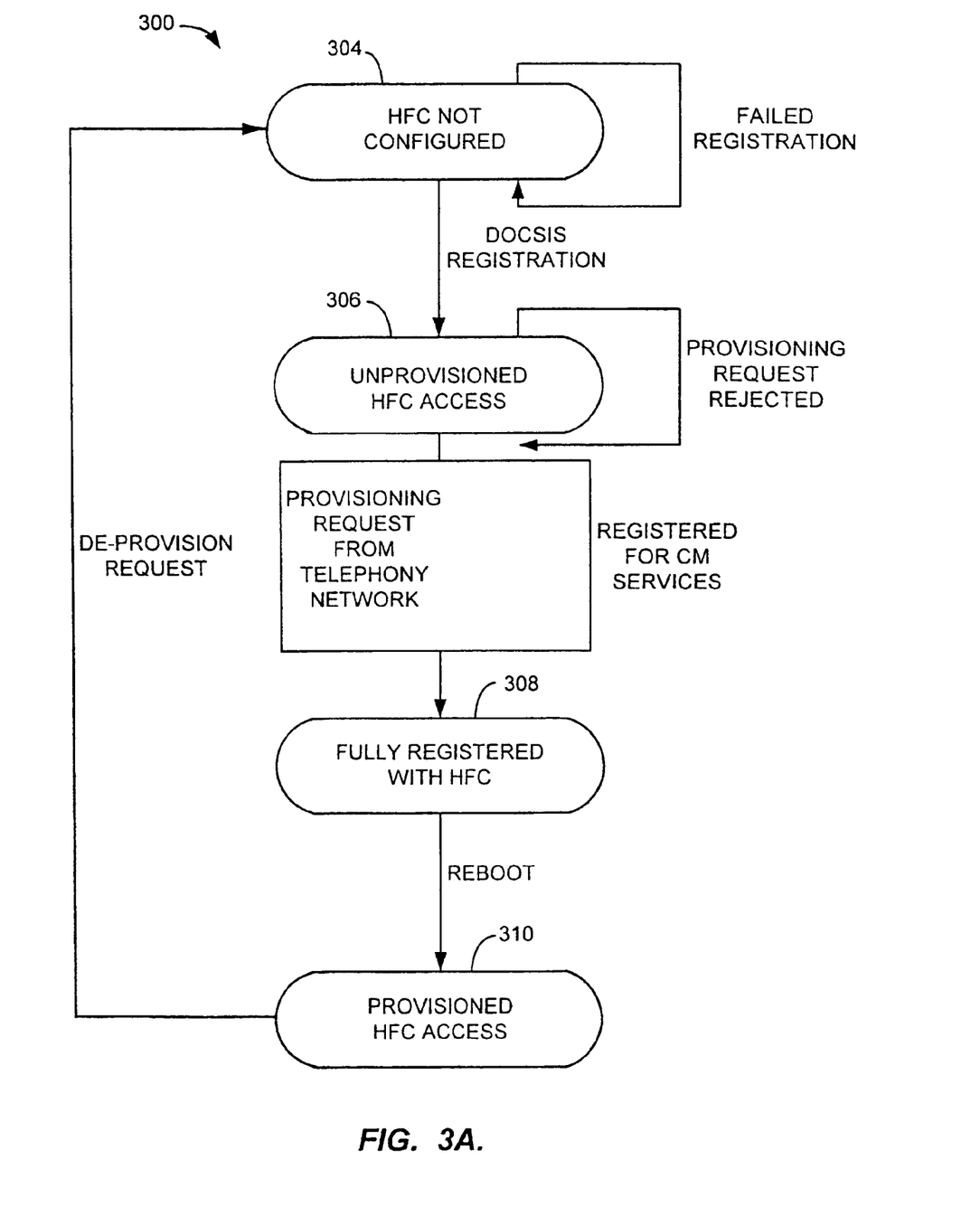
FIG. 3A shows an HFC access state machine diagram for a CTA constructed in accordance with the present invention.
Figure 3B:
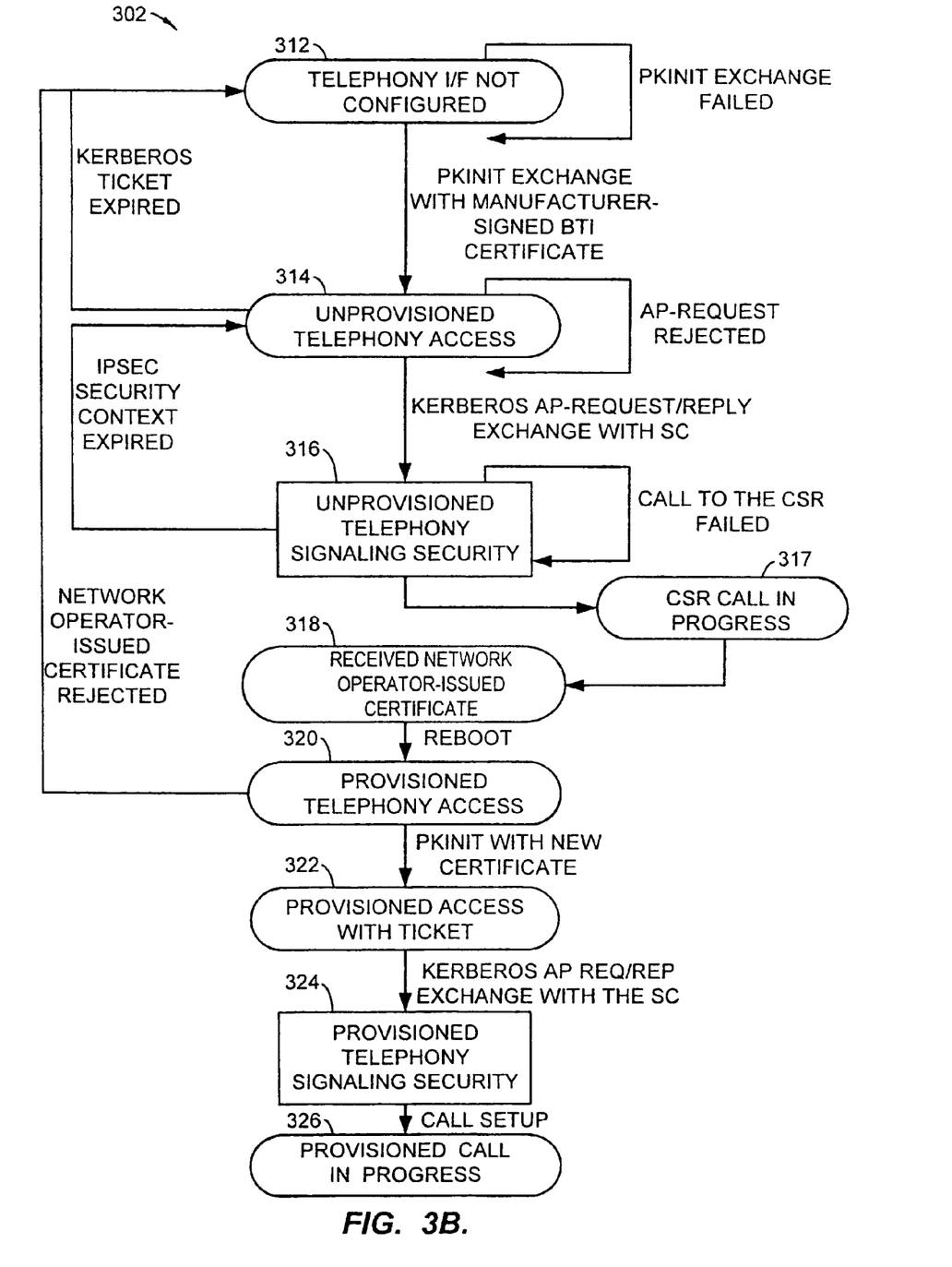
FIG. 3B shows a telephony access state machine diagram for a CTA constructed in accordance with the present invention.

FIGS. 3A and 3B show two separate provisioning state machines that are performed by the CTA 102. FIG. 3A shows an access state machine diagram 300 for HFC access provisioning. FIG. 3B shows a telephony state machine diagram 302 for telephony access provisioning. Operation of the state machines are described in the following sections.

The states in the HFC access state machine 300 are:

(304) HFC Not Configured—In this state the CTA is not provisioned and has not yet tried to register with the HFC head-end.

(306) Unprovisioned HFC Access—In this state the CTA is registered with the HFC head-end, but there is no customer account set up. One reason the CTA was allowed to register, is so that it can get access to the CSR to get provisioned in both the telephony and HFC networks.

(308) Fully Registered with HFC—In this state the CTA is registered in the HFC network's authorization database. However, the CTA's internal state does not yet permit it to send packets anywhere within the telephony network. In order to get to this state, the CTA customer account was set up in the telephony network. The Provisioning CA in the telephony network has notified the HFC head-end that CTA access to the telephony network should be fully enabled. Alternatively, the CTA is integrated with general purpose Cable Modem access. The Cable Modem has been registered for HFC access to some non-telephony network services (e.g. Internet access).

(310) Provisioned HFC Access—In this state the CTA that was fully registered with HFC was rebooted and is now given full access to the telephony network or some other network services.

The states in the telephony access state machine 302 are:

(312) Telephony I/F Not Configured—In this state the CTA is not provisioned with the telephony network and has not yet tried to register with the telephony network.

(314) Unprovisioned Telephony Access—To get to this state, the CTA performed a public key initial authentication in Kerberos (PKINIT) exchange with the manufacturer issued certificate stored in the cryptographic module 214. This grants the CTA the right to make a phone call to the CSR and maybe to call 911.

(316) Unprovisioned Telephony Signaling Security—To get to this state, the unprovisioned CTA went off-hook, at which time it used a Kerberos ticket from the PKINIT exchange to establish a set of keys for use with IPSec ESP. IPSec ESP sessions will be used for signaling messages with the Signaling Controller, the CSR's CTA or Telephony Gateway and possibly with some additional Telephony Network Servers.

(317) CSR Call in progress—In this state an unprovisioned call to the CSR allows voice data to be exchanged using a secure protocol. To get to this state, the unprovisioned CTA exchanged signaling messages with the Signaling Controller over IPSec ESP and in the process got a key from the Signaling Controller for encrypting all communications with the CSR's CTA.

(318) Received Network Operator-Issued Certificate—To get to this state, the CTA customer picked up the phone and called the CSR. The customer provided information such as the name, address, and credit card number to the CSR. The CSR entered this information into a database. As a result, both the Telephony Network and the HFC Network were reconfigured to allow access to this customer, and a Network Operator-issued X.509 certificate was sent down to the CTA. In this state, the CTA is fully provisioned for the telephony service, but can't yet use it until it reboots.

(320) Provisioned Telephony Access—To get to this state the CTA got its Network Operator-issued certificate, it was rebooted, and will next attempt a PKINIT exchange with the new certificate that should grant it the ability to make telephone calls, based on the subscribed service options. In the case where the CTA's privileges were revoked (perhaps the customer simply discontinued service), a PKINIT exchange with the Network Operator-issued certificate will fail. That will cause the CTA to go back to the Telephony I/F Not Configured state, where the CTA may get provisioned again.

(322) Provisioned Access with Ticket—To get to this state the CTA performed a PKINIT exchange with the new certificate and was granted the ability to make telephone calls, based on the subscribed service options.

(324) Provisioned Telephony Signaling Security—To get to this state the CTA performed a Kerberos AP Req/Rep exchange with the signaling controller and set up IPSec Security Associations to protect all signaling messages between them.

(326) Provisioned Call in progress—In this state a provisioned call allows voice data to be exchanged using a secure protocol. To get to this state, the CTA exchanged signaling messages with the Signaling Controller over IPSec ESP and in the process got a key from the Signaling Controller for encrypting all communications with the other CTA.

CTA Provisioning

The following is a description of the keys and certificates that may be provisioned at the CTA in accordance with the present invention. In one embodiment of the present invention, items 1, 3 and 5 are stored in the cryptographic module 214 and items 2, 4 are stored in the cryptographic module 214 or the memory 212.

1. An RSA key pair that is installed at the factory

2. An X.509 certificate issued by a network operator during the provisioning phase for the CTA RSA key pair. This certificate is good only for a particular network operator.

3. An X.509 certificate issued by the manufacturer and normally installed at the factory. This certificate is good for the lifetime of the CTA.

4. A manufacturer's certificate signed by a root CA. This certificate is normally installed at the factory, but may be embedded in software downloaded while on-line. This certificate should be valid for at least the expected lifetime of the CTA.

5. A root public key used by the CTA to verify network operator's certificate that it obtains during provisioning.

Provisioning Scenarios

A variety of provisioning scenarios are herein described for provisioning a CTA in accordance with the present invention. These specific provisioning scenarios are assuming that the KDC and the Signaling Controller are co-located on the same host. However, in general this invention is not limited to specific physical locations of the KDC and the Signaling Controller and their co-location on the same host is not required.

Initial Customer Registration

Figure 4:
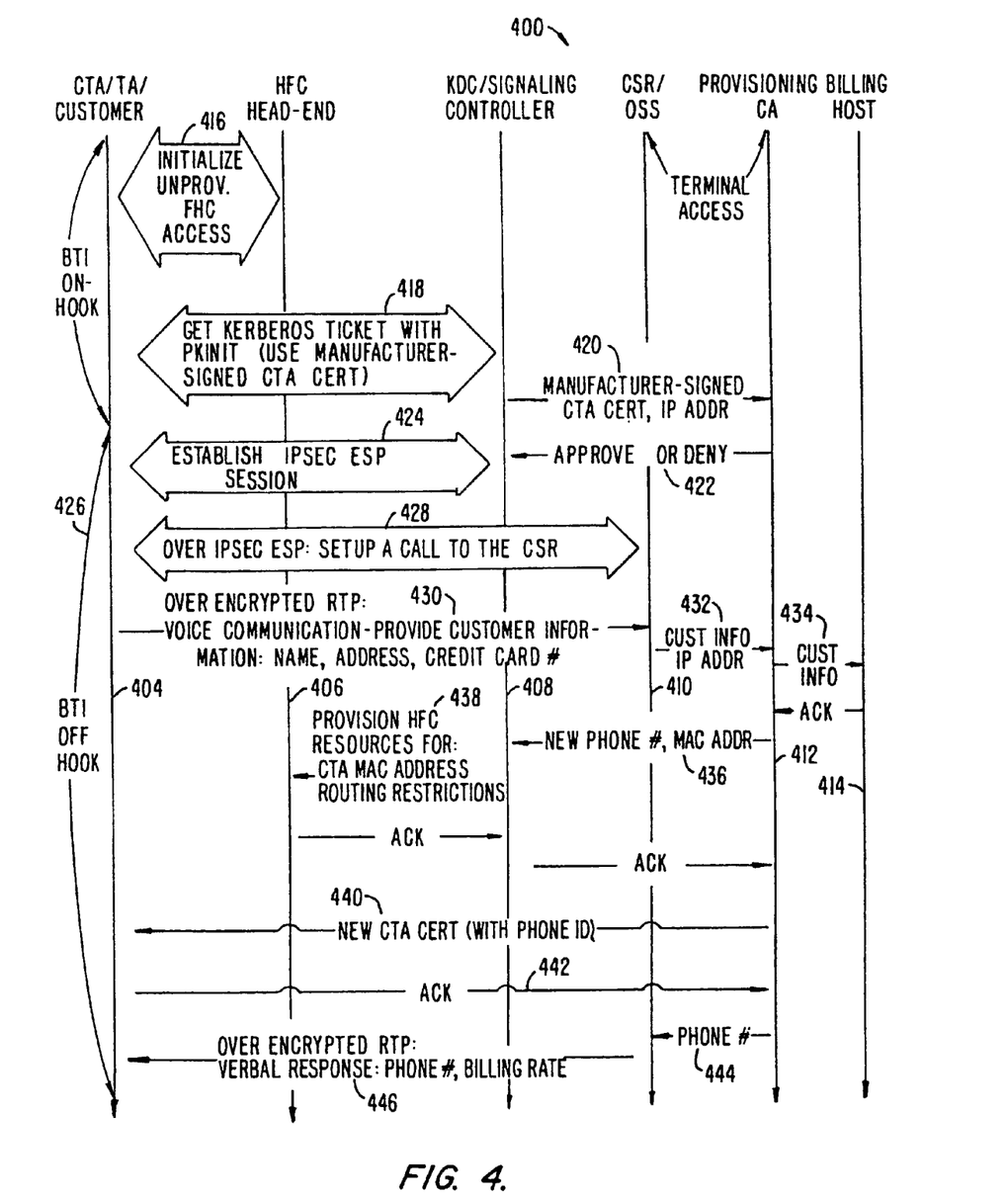
FIG. 4 shows a messaging diagram for provisioning a CTA in accordance with the present invention.

FIG. 4 shows a message exchange diagram 400 illustrating how messages are exchanged between the components of the telephony network 100, to achieve initial customer registration in accordance with the present invention. The exchange diagram 400 shows messages transmitted or received at the CTA/TA/customer 104/102 at line 404, the HFC head-end 106 at line 406, the KDC 112 and Signaling Controller 116 at line 408, the CSR center 116 at line 410, the provisioning CA 118 at line 412 and the billing host 120 at line 414.

Figure 5:
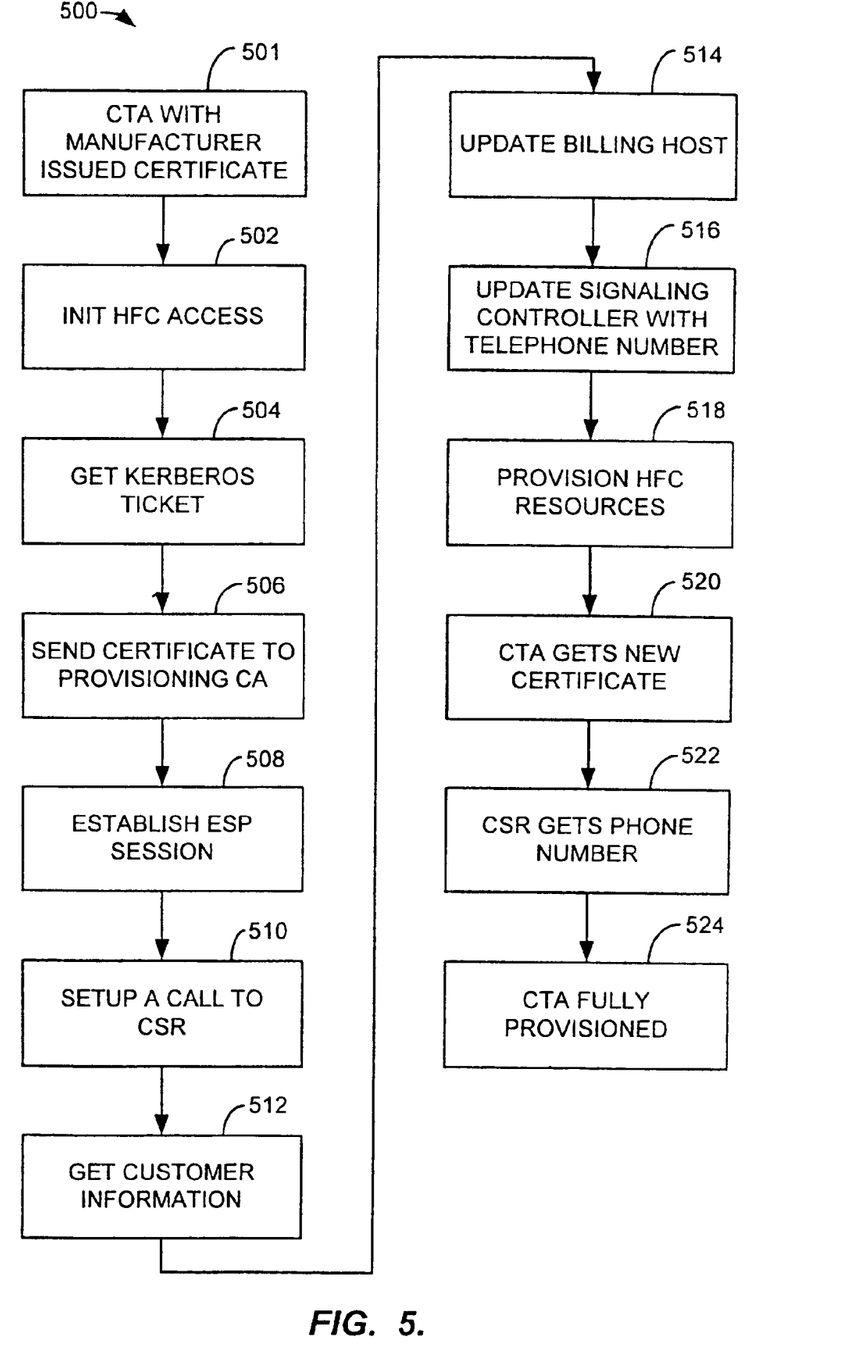
FIG. 5 shows a method for provisioning a CTA using the messages of FIG. 4.

FIG. 5 shows a flow diagram 500 illustrating the process of initial customer registration utilizing a CTA with a manufacturer issued certificate and messages shown in FIG. 4 in accordance with the present invention.

At block 501, the CTA coupled to the HFC includes a manufacturer issued certificate in accordance with the present invention.

At block 502 messages are exchanged between the CTA and the HFC head-end to initialize unprovisioned HFC access. These messages are shown in FIG. 4 at 416. In this block, the CTA receives a code image from the HFC head-end that includes the Network Operator Certificate. This certificate will later be used by the CTA to validate both the KDC's certificate and the CTA's own certificate issued by the network operator. The standard DOCSIS registration process for a cable modem is utilized in the case of an integrated CTA or for attached Customer Premises Equipment (CPE) in the case of a telephony adapter (TA). Since the CTA (or TA) is not provisioned at this point, it is assigned an unprovisioned IP address. This restricts the CTA to exchanging messages with the following hosts (IP addresses):

Local Signaling Controller (110)

CSR (116)

Provisioning CA (118)

At block 504, a Kerberos Ticket is obtained with PKINIT as shown in FIG. 4 at 418. This is a standard PKINIT exchange, for example, as described in section 5.2.2 of the '772 provisional patent application.

The certificate used by the CTA during the PKINIT is one that was installed in the factory and signed by the manufacturer. This certificate contains the CTA MAC address, which may be verified by the KDC. In one embodiment, it is recommended that the KDC checks with the HFC head-end to see if the IP address is valid and if the MAC address (in the certificate) corresponds to that IP address and has not been marked as "bad" at the HFC head-end. It is possible that the HFC head-end employs some sort of a physical layer cloning detection scheme that may identified the current CTA unit as a clone. The CTA manufacturer certificate sent in the PKINIT request is also required in order for the Signaling Controller to verify the signature on the CTA certificate. The CTA also verifies the KDC signature and certificate during this step the KDC certificate is verified with the previously obtained Network Operator Certificate.

The obtained Kerberos ticket has additional information, which restricts the CTA to telephone calls to only a single destination—the CSR. If desired, the unprovisioned CTA may also be allowed to call the 911 number. This restriction may be placed inside an authorization-data field inside the Kerberos ticket.

At block 506 the manufacturer issued CTA certificate, obtained by the Signaling Controller during the PKINIT exchange is passed on (along with the CTA's unprovisioned IP address) to the provisioning CA as shown in FIG. 4 at 420. The CA will save this certificate and will later (when it receives customer information) use it to generate another CTA certificate, specific to this telephone network.

The IP address of the Signaling Controller (same as the IP Address of the KDC) will also be saved by the provisioning CA, so that later in the process it can inform the Signaling Controller about the telephone number of the newly provisioned CTA.

At block 508 if the manufacturer issued CTA certificate is approved by the provisioning CA, as shown at 422, an IPSec ESP Session is established, as shown at 424. This is the first action that happens when the unprovisioned CTA or TA goes off-hook, as shown at 426. The Kerberos ticket is used in AP Request (Req) and AP Reply (Rep) messages to mutually authenticate the CTA and Signaling Controller and to obtain a sub-key. This sub-key is used to derive all of the necessary keying material for IPSec ESP. For example, details of one embodiment are provided in the '772 provisional patent application at section 5.2.2

The Kerberos ticket may contain restrictions, limiting the CTA to calls to the CSR (and possibly the 911 number). The Signaling Controller must enforce these restrictions on the subsequent calls from this CTA.

At block 510, a call to the CSR is setup as shown in FIG. 4 at 428. In this step, signaling messages are exchanged in order to establish a voice connection with the CSR. This includes CTA-to-SC messages, CTA-to-CTA messages, and possibly signaling messages exchanged with another Network Server. A sub-key distribution scheme for securing CTA-to-Network Server and CTA-to-CTA links (i.e. one scheme is explained in the '772 application at section 5.2.3.1) is also included in this step. All signaling messages are sent over a secure IPSec ESP layer.

In another embodiment, the CTA software may be configured so that when it is in the unprovisioned state, it automatically dials the CSR as soon as the phone goes off-hook. In this case, however, the unprovisioned CTA would not be able to dial 911. If 911 access is a requirement, then the CSR telephone number should be dialed manually.

At block 512, it may be necessary to obtain customer information as shown in FIG. 4 at 430. In a situation where the customer is performing his or her own installation, he or she provides customer information over the phone, including a name, address, credit card number, etc. The customer also specifies the type of desired service. The customer may also specify the desired telephone number (if such an option is available in the particular IP Telephony network).

If an installer came in with a work order number, all of the customer information and the CTA identity should already be available to the Network Operator (from an earlier phone call). At this time, the installer simply provides the work order number, and the CSR is able to find all of the corresponding customer information.

It is not necessary that a human customer service representative answers the phone on the Network Operator side. Instead, the customer or installer may be directed to a voice menu, where all of the required information is entered through the telephone keypad. This is especially convenient when an installer is calling with a work order number.

The customer information entered by the CSR goes into the provisioning CA first, as shown at 432, which assigns the customer a telephone number, appropriate for where the customer is located.

The CSR has a way to determine the calling CTA's (unprovisioned) IP address, which is also sent to the provisioning CA, along with the customer information. This information will enable the provisioning CA to send messages (described later in this scenario) to configure the calling CTA. Also, the CTA IP address is used by the provisioning CA to find the manufacturer issued certificate (received as describe above) for the calling CTA.

This means that the CSR's CTA has an ability to display the IP address of the calling CTA. Alternatively, if the CSR is using a regular phone, connected to a PSTN Gateway, the CSR gets the IP address from the gateway. It is also possible, that there is an OSS connected to the CSR's CTA or PSTN Gateway and it automatically detects the IP address of the calling CTA and delivers it to the provisioning CA.

At block 514, the provisioning CA updates the billing host with the customer information and the assigned telephone number, as shown in FIG. 4 at 434.

At block 516, the new telephone number and the corresponding MAC address (found in the original manufacturer issued CTA certificate) are sent over from the provisioning CA to the Signaling Controller, as shown at FIG. 4 at 436. This will allow the Signaling Controller to accept a CTA certificate that contains that telephone number. The MAC address is used by the Signaling Controller (in the following message) to provision the necessary HFC resources for the CTA.

At block 518, the Signaling Controller provisions the CTA for the required HFC resources, as shown in FIG. 4 at 438. The Signaling Controller sends to the HFC head-end the CTA MAC address and routing information—legal source and destination IP addresses for this CTA. Other information may also be required by the HFC head-end. After this step, the CTA is allowed to exchange messages with any node in the IP telephony network.

At block 520, the provisioning is completed after the CTA receives its new certificate, signed by the new Network Operator, and containing CTA identifying information for this telephony network (the phone ID), as shown in FIG. 4 at 440. The phone ID may be a one-way function of the phone number (e.g. SHA-1 hash), but cannot be the phone number itself (which may be unlisted). The Network Operator certificate needed to verify the new CTA certificate should already be present in the CTA. At this point the CTA is ready to place and receive telephone calls anywhere within this telephone network. The message shown at 440 is acknowledged at 442.

At block 522, the CSR gets back the telephone number from the provisioning CA (e.g. on the screen), as shown in FIG. 4 at 444, and relays it over the phone to the CTA customer, along with how the customer will be billed, etc., as shown in FIG. 4 at 446.

At block 524, the CTA is fully provisioned to use the telephony network.

De-Provisioning a CTA

Figure 6:
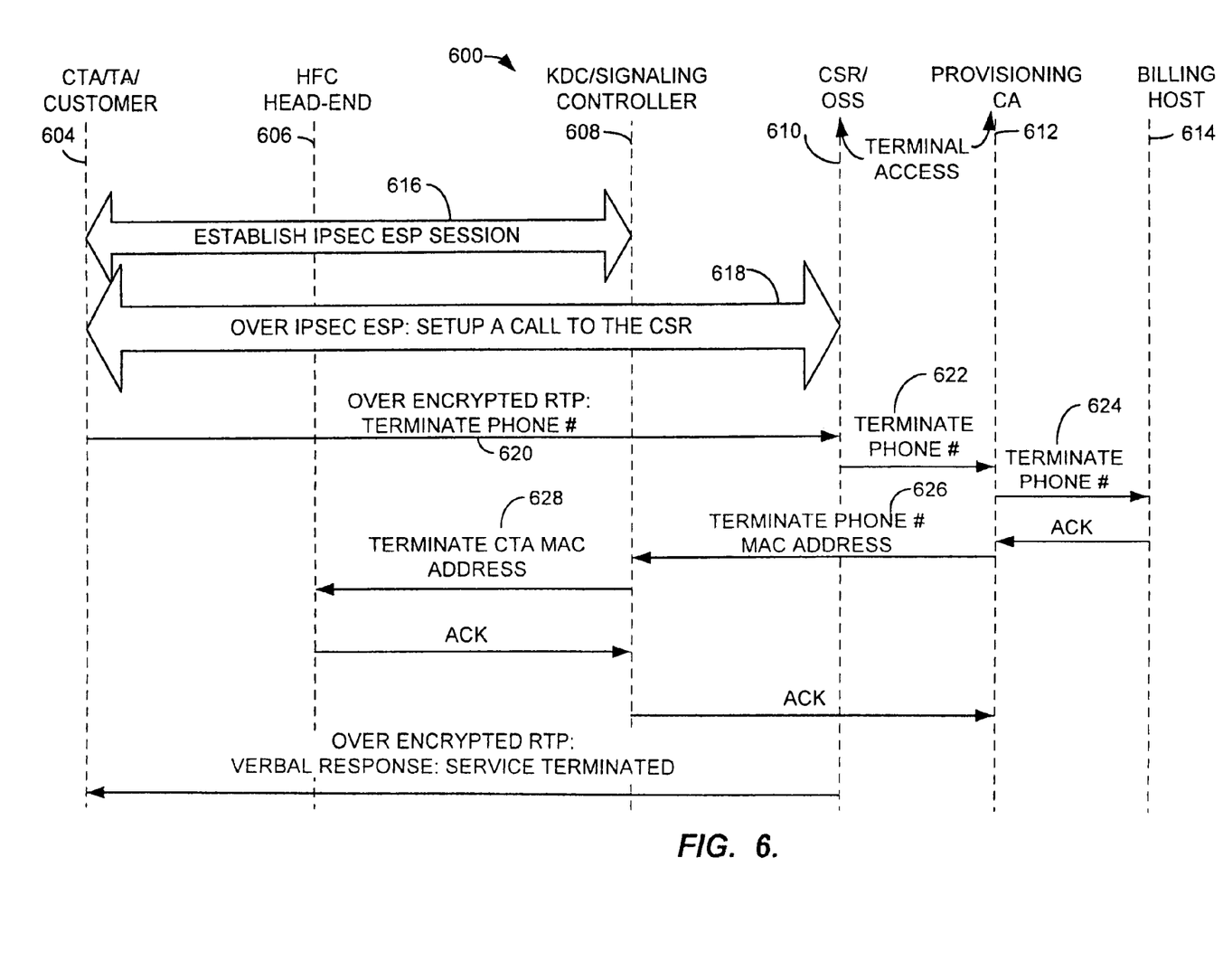
FIG. 6 shows a messaging diagram for de-provisioning a CTA in accordance with the present invention.

FIG. 6 shows a message exchange diagram 600 illustrating how messages are exchanged between the components of the telephony network 100 to achieve de-provisioning in accordance with the present invention. The exchange diagram 600 shows messages transmitted or received from the CTA/TA/customer 104/102 at line 604, the HFC head-end 106 at line 606, the KDC 112 and Signaling Controller 116 at line 608, the CSR center 124 at line 610, the provisioning CA 126 at line 612 and the billing host 128 at line 614.

For whatever reason, the customer may wish to discontinue currently established telephone service for the CTA. It may be that the customer is changing IP telephony providers, or moving to a new location not supported by the current IP telephony provider.

In the de-provisioning scenario described below, it is assumed that the customer has a valid Kerberos ticket and has established an IPSec ESP session, as shown at 616. It will also be assumed that a call to the CSR has been performed as shown at 618.

To de-provision the service, the customer simply requests termination of the service on a particular date with the CSR, as shown at 620. The CSR relays this information to the provisioning CA, as shown at 622. The provisioning CA in turn sends a termination request to the billing host, as shown at 624 and the Signaling Controller, as shown at 626. The Signaling Controller in turn propagates the termination request to the HFC head-end, as shown at 628.

Next time that the CTA tries to use its Kerberos ticket before making a phone call, the ticket will be rejected (because that phone number is no longer in the Signaling Controller's database). That will cause the CTA to try and obtain another Kerberos ticket. It will try to perform a PKINIT exchange with its Network Operator signed certificate but will fail again. This will cause the CTA to remove the invalid certificate and transition into an unprovisioned state.

Provisioning a Previously Used CTA

The following scenario applies in cases where a new IP telephony customer is registering with a particular network operator, and the CTA he or she is using is not brand-new out of the factory. The CTA may have been used:

by the same customer with a different network operator,
by a different customer with the same network operator, or
by a different customer with a different network operator.

Regardless of how the CTA was used previously, the previous identity and the previous certificate issued by the old network operator is still stored in the CTA. That certificate is no longer valid and it will be assumed that the CTA was already de-provisioned, as described above.

In this case, the CTA will attempt to perform a PKINIT exchange, using an old certificate that is no longer valid. The CTA will get an error back from the Signaling Controller indicating that the certificate is invalid. The CTA software will then automatically remove the invalid certificate and transition into the unprovisioned state. At this time, the CTA provisioning will proceed according to the scenario described above in the section entitled Initial Customer Registration.

Change of Service

Figure 7:
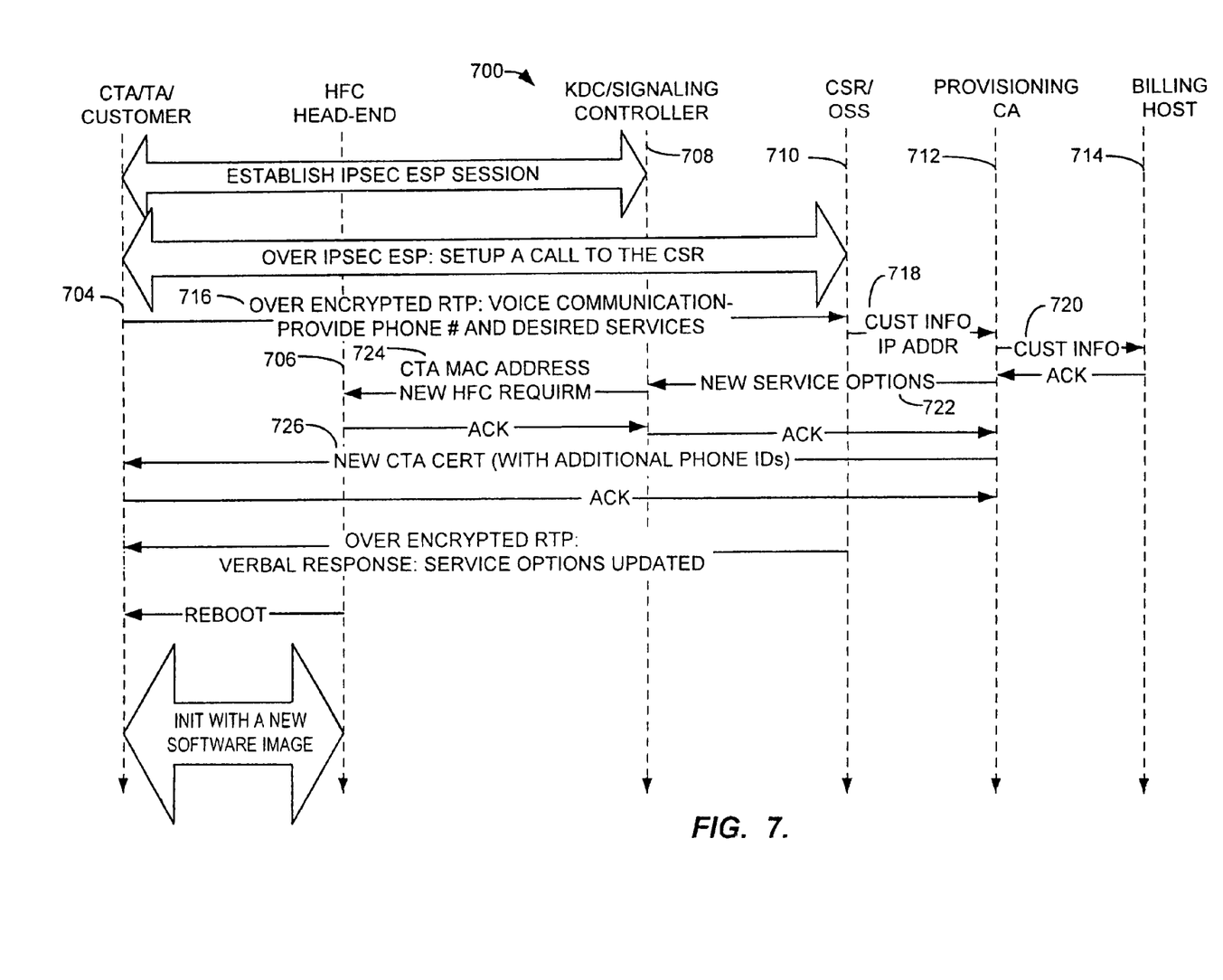
FIG. 7 shows a messaging diagram for implementing change of service for a CTA in accordance with the present invention.

FIG. 7 shows a message exchange diagram 700 illustrating how messages are exchanged between the components of the telephony network 100 to achieve change of service in accordance with the present invention. The exchange diagram 700 shows messages transmitted or received from the CTA/TA/customer 104 at line 704, the HFC head-end 106 at line 706, the KDC 112 and Signaling Controller 116 at line 708, the CSR center 124 at line 710, the provisioning CA 126 at line 712 and the billing host 128 at line 714.

In this scenario, the CTA is re-provisioned to change established service options. For example, a Caller ID service may be added or a different billing option selected, etc. In most cases, the change of service will not require the provisioning CA to issue a new CTA certificate. The one exception, is where a CTA is provisioned for an additional phone number (on another CTA port). In that case, the provisioning CA will issue a new CTA certificate containing an updated list of phone IDs for that CTA.

In the change of service scenario, the customer calls up the CSR to request the changes in service, as shown at 716. The CSR sends the update to the provisioning CA, as shown at 718, which relays that change to the Billing Host, as shown at 720 and the Signaling Controller, as shown at 722. The Signaling Controller in turn relays the change to the HFC head-end, as shown at 724. If necessary, the CTA will be issued a new certificate, as shown at 726, and may also be instructed by the HFC head-end to download a different version of the CTA software.

The CTA already possesses a network operator certificate, so that it is able to perform a signature verification check along with the time validity check on the new certificate. The time validity check will not only make sure that the issued certificate had not expired—it will also make sure that the new certificate's starting time is greater than the starting time of the old certificate (i.e. the new certificate is not a replay).

Move to a Different HFC Segment

Figure 8:
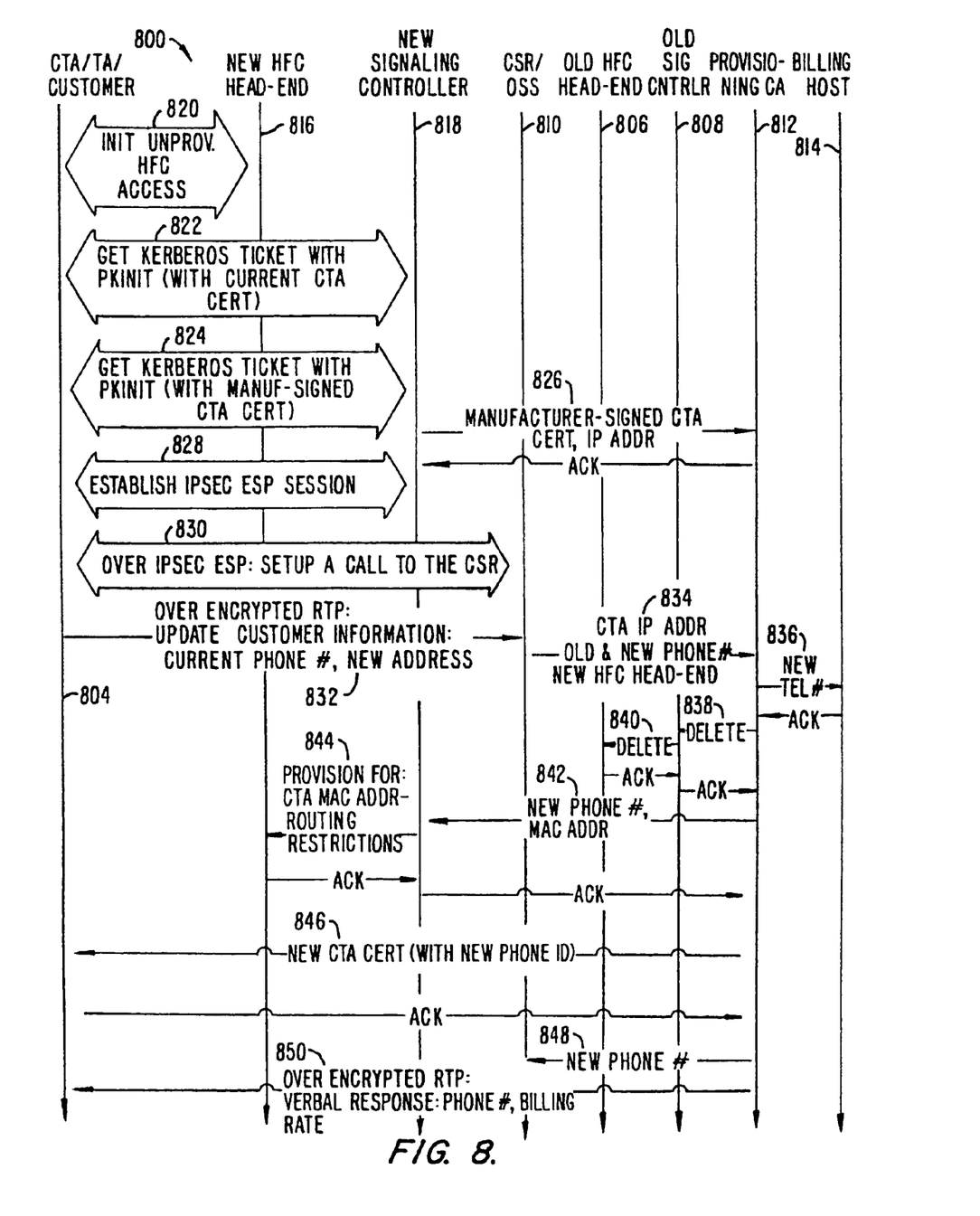
FIG. 8 shows a messaging diagram for moving a CTA to a different HFC segment in accordance with the present invention.

FIG. 8 shows a message exchange diagram 800 illustrating how messages are exchanged between the components of the telephony network 100 to move a CTA to a different HFC segment in accordance with the present invention. The exchange diagram 800 shows messages transmitted or received from the CTA/TA/customer 104 at line 804, the HFC head-end 106 at line 806, the KDC 112 and Signaling Controller 116 at line 808, the CSR center 124 at line 810, the provisioning CA 126 at line 812 and the billing host 128 at line 814. The exchange diagram 800 also shows messages transmitted or received from a new HFC head-end at 816, and a new Signaling Controller at 818. The new HFC head-end and new Signaling Controller are not shown in FIG. 1.

Figure 9:
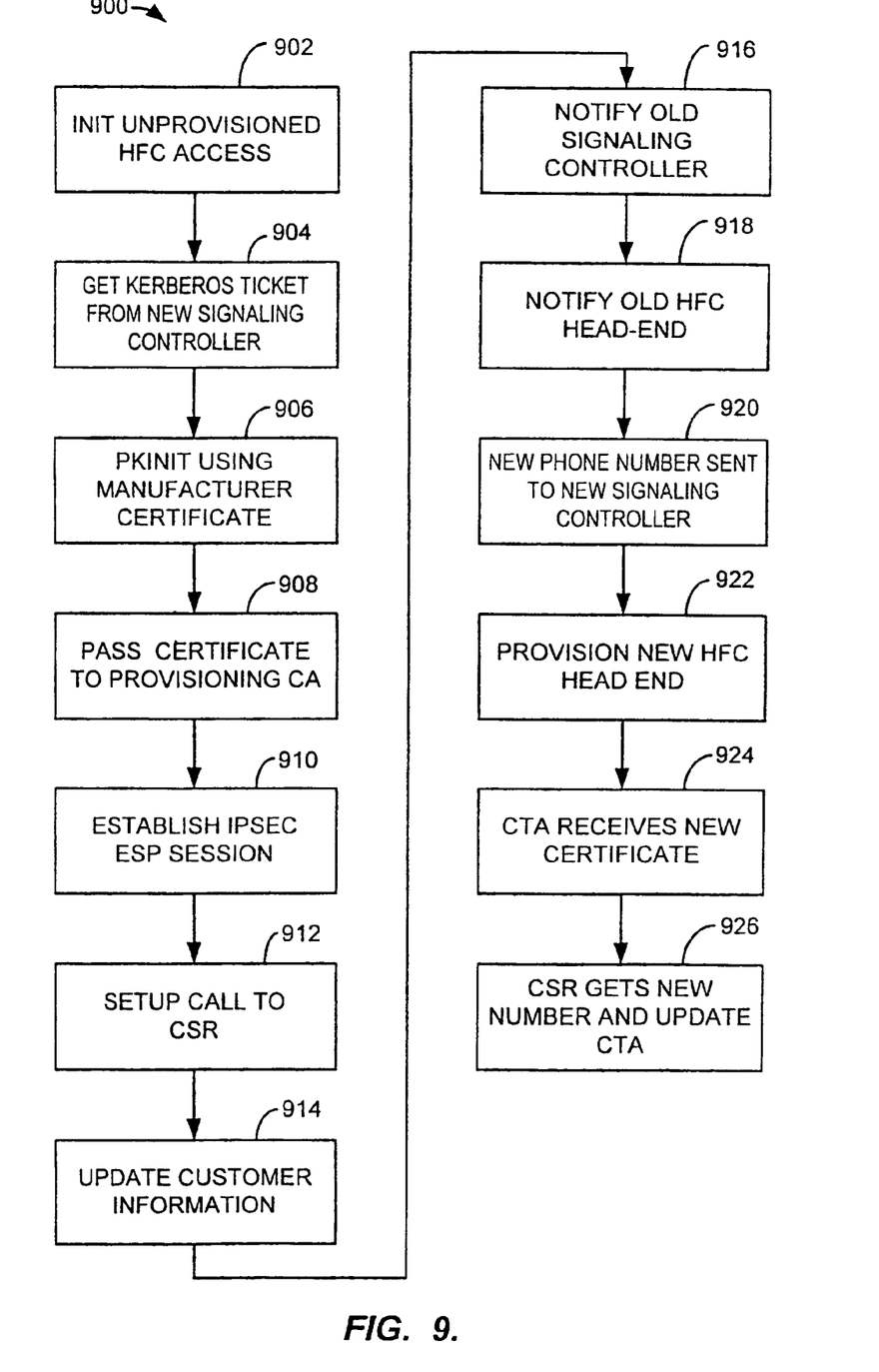
FIG. 9 shows a method for moving a CTA to a different HFC segment using the messages of FIG. 8.

FIG. 9 shows a flow diagram 900 illustrating the process of moving a CTA to a different HFC segment utilizing messages shown in FIG. 8 in accordance with the present invention.

In this scenario the CTA owner moves to a new location, corresponding to a new HFC segment. The same IP telephony company serves the new area, but the CTA has to be assigned a new telephone number and re-provisioned for the new HFC segment.

At block 902, the customer moves to a different location, still covered by the same IP Telephony company, however, the customer now has to connect to a different HFC head-end that has not been previously provisioned for this CTA. As a result, the CTA is initialized with an un-provisioned IP address by the new HFC head-end as shown in FIG. 8 at 820.

At block 904, the CTA proceeds with a PKINIT exchange with the new Signaling Controller, using its current certificate issued by the Network Operator, as shown in FIG. 8 at 822. However, the new Signaling Controller does not recognize the certificate and the PKINIT exchange fails.

At block 906, the CTA now falls back to a PKINIT exchange with the new Signaling Controller using the manufacturer issued certificate and succeeds, as shown in FIG. 8 at 824.

At block 908, the manufacturer issued CTA certificate, obtained by the KDC during the PKINIT exchange is passed on to the provisioning CA, as shown in FIG. 8 at 826. The provisioning CA doesn't actually need this certificate, because it already contains a CTA certificate (for the old HFC segment). This step is done for consistency—the KDC does this every time for an unprovisioned CTA. Along with the CTA certificate, the KDC also sends the unprovisioned IP address for that CTA. The IP address of the Signaling Controller (which may be the same as the IP address of the KDC) will also be saved by the Provisioning CA, so that it can later inform the Signaling Controller about the new Customer ID of the newly provisioned CTA.

At block 910, an IPSec ESP Session is established, as shown in FIG. 8 at 828. This is the first action that happens when the unprovisioned CTA or TA goes off-hook. A Kerberos ticket is used in the AP Request/AP Reply messages to mutually authenticate the CTA and Signaling Controller and to obtain a sub-key. This sub-key is used to derive all of the necessary keying material for IPSec ESP.

The Kerberos ticket contains restrictions, limiting the CTA to calls to the CSR (and possibly the 911 number). The new Signaling Controller must enforce these restrictions on the subsequent calls from this CTA.

At block 912, a call to CSR is setup, as shown in FIG. 8 at 830. In this step, signaling messages are exchanged, in order to establish a voice connection with a CSR. This includes CTA-to-SC messages, CTA-to-CTA messages, and possibly signaling messages exchanged with another Network Server. The key distribution for securing CTA-to-Network Server and CTA-to-CTA links is also included in this step. All signaling messages are sent over a secure IPSec ESP layer.

The CTA software may be configured, so that when it is in an unprovisioned state, it automatically dials the CSR, as soon as the phone goes off-hook. In this case, however, an unprovisioned CTA will not be able to dial 911. If that is a requirement, then the CSR telephone number should be dialed manually.

At block 914, the customer information is updated, as shown in FIG. 8 at 832. The CSR will send (manually enter) the provisioning CA the old telephone number and the new customer information, as shown in FIG. 8 at 834. The provisioning CA will update the billing host with the new customer information and with both the old and the new customer ID, based on the new customer location, as shown in FIG. 8 at 836.

The CSR must have a way to determine the calling CTA's (unprovisioned) IP address, which is also sent to the provisioning CA, along with the customer information. This information will enable the provisioning CA to send messages (described later in this scenario) to configure the calling CTA. The CTA IP address is also used by the provisioning CA to find the manufacturer issued certificate for the calling CTA.

This means that the CSR's CTA must have an ability to display the IP address of the calling CTA. Alternatively, if the CSR is using a regular phone, connected to a Public Switched Telephone Network (PSTN) Gateway, the CSR gets the IP address from the gateway. It is also possible, that there is an OSS connected to the CSR's CTA or the PSTN Gateway and it automatically detects the IP address of the calling CTA and delivers it to the provisioning CA.

At block 916, the Old Signaling Controller is notified that the old customer ID (phone number) is no longer authorized and should be removed from its database, as shown in FIG. 8 at 838. The corresponding MAC address (found in the original manufacturer issued CTA certificate) is also sent. This MAC address is used by the Signaling Controller to remove the HFC resources for this CTA in the old HFC head-end.

At block 918, the old HFC head-end is notified by the old Signaling Controller that the CTA MAC address is no longer provisioned for that particular HFC segment, as shown in FIG. 8 at 840.

At block 920, the new phone number and the corresponding MAC are sent over from the provisioning CA to the new Signaling Controller, as shown in FIG. 8 at 842. This will allow the new Signaling Controller to accept a CTA certificate that contains the corresponding phone ID. The MAC address is used by the new Signaling Controller (in the following message) to provision the necessary HFC resources for the CTA.

At block 922, the new Signaling Controller provisions the CTA for the required HFC resources. It sends to the new HFC head-end the CTA MAC address and routing information—legal source and destination IP addresses for this CTA, as shown in FIG. 8 at 844. Other information may also be required by the new HFC head-end.

After this step, the CTA is allowed to exchange messages with any node in the IP telephony network.

At block 924, the provisioning is completed in this step after the CTA receives its new certificate signed by the new Network Operator and containing the new phone ID, as shown in FIG. 8 at 846. Now, the CTA is ready to place and receive telephone calls anywhere within this telephone network.

At block 926, the CSR gets the new telephone number from the provisioning CA, as shown in FIG. 8 at 848, and relays it over the phone to the CTA customer, as shown in FIG. 8 at 850.

Repairing a CTA

When a CTA needs repair, certificates provided by the present invention can be used to repair and test the CTA, and thereafter, allow the customer to provision the repaired CTA for use in a telephony network. The following steps for repair are:

A damaged CTA is shipped to a repair facility.

After the CTA is fixed, it needs to be tested. To test the CTA, it is re-provisioned for a special account associated with the repair facility and undergoes testing. This insures that the customer does not get billed for the telephone services that are being tested by the repair facility.

To re-provision the CTA for testing, a test engineer removes the customer certificate in the CTA, possibly through the front panel controls on the CTA. The customer is still provisioned in the telephony network and the certificate can always be loaded back from the network, as described in a previous section.

The CTA enters the unprovisioned state (even though the customer is still provisioned) and will follow the provisioning steps outlined above for Initial customer registration using the repair facility certificate.

The CTA is now provisioned for the repair facility to allowed the required testing to take place. The repair facility certificate should have a short validity period (a few days or even a few hours).

Replacing a CTA

It is assumed in this scenario that the original CTA was broken and shipped to a repair facility. Meanwhile, a different CTA was sent to the customer, so that he or she does not have to wait for the original CTA to be repaired.

In this case, the replacement CTA is provisioned as if it were a new CTA —see FIGS. 4 and 5.

CTA Returns from Repair

In this scenario, a CTA was repaired and tested in the repair facility.

During the testing phase, the CTA certificate was replaced with the one for the repair facility. After the testing was completed, the test certificate is either removed from the CTA using the front panel or the CTA underwent the full de-provisioning process illustrated in FIG. 6. In any event the repair facility certificate expires in a relatively short time.

Figure 10:
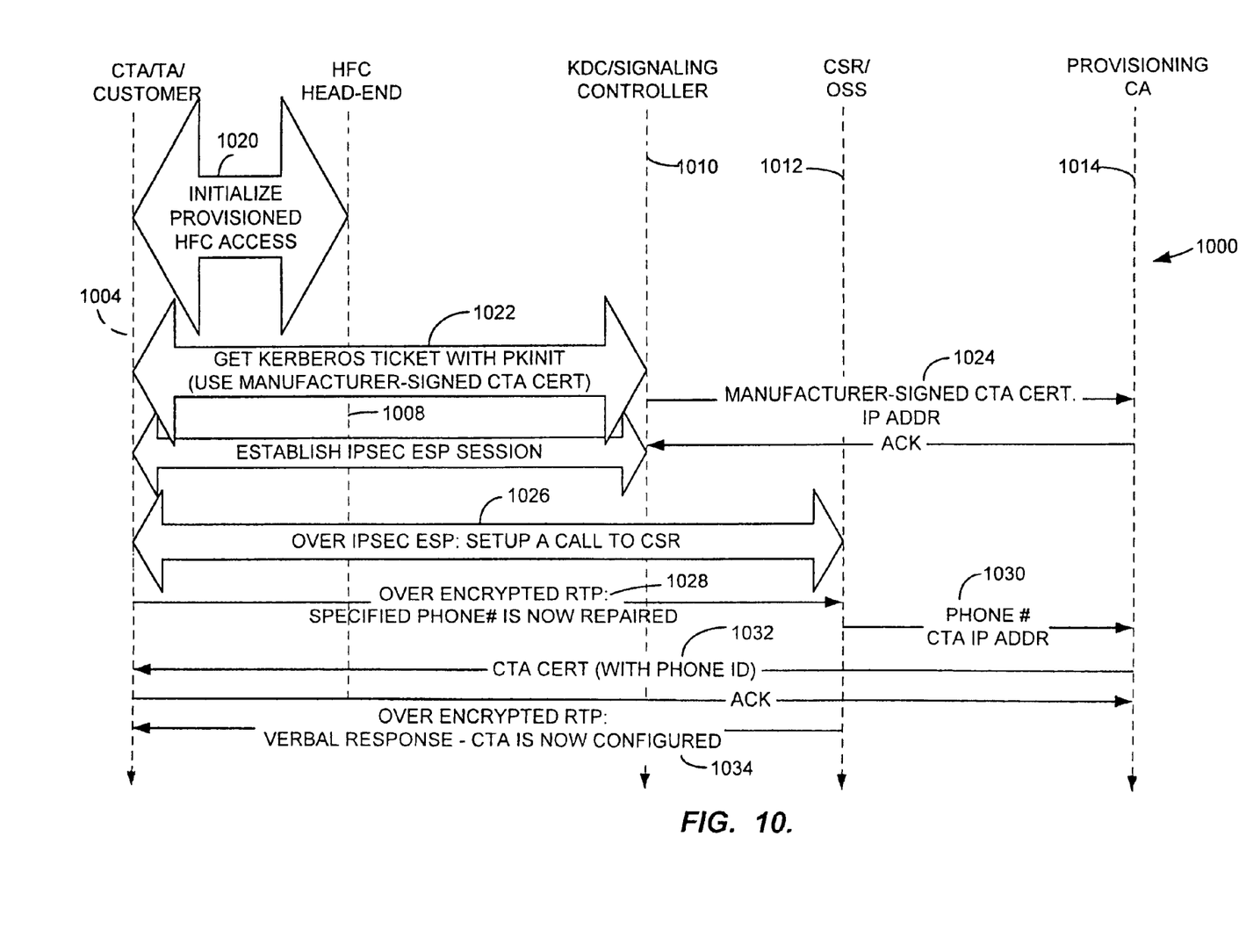
FIG. 10 shows a messaging diagram for activating a CTA after repair in accordance with the present invention.

FIG. 10 shows a message exchange diagram 1000 illustrating how messages are exchanged between the components of the telephony network 100 to provision a CTA that has been returned from a repair facility. The exchange diagram 1000 shows messages transmitted or received from the CTA/TA/customer 104 at line 1004, the HFC head-end 106 at line 1006, the KDC 112 and Signaling Controller 116 at line 1008, the CSR center 124 at line 1010, the provisioning CA 126 at line 1012 and the billing host 128 at line 1014.

In the exchange diagram 1000, the CTA gets unprovisioned access to the HFC segment connected to the repair facility and attempts to initialize provisioned access, as shown at 1020. The CTA performs an unprovisioned PKINIT exchange with the local Signaling Controller, as shown at 1022, which relays the manufacturer issued CTA certificate to the provisioning CA, as shown at 1024. In this case, the provisioning CA has no use for this certificate, but accepts the message anyway for consistency. (The Signaling Controller always sends this certificate for an unprovisioned CTA.)

After an IPSec ESP session is established, as shown at 1026, a technician at the repair facility then calls up the CSR and explains that the CTA has now been repaired and should be configured back with the owner's certificate, as shown at 1028. The CSR enters this request into the provisioning CA, as shown at 1030, which sends the CTA a certificate, as shown at 1032.

As with other provisioning scenarios, the CSR has to determine the unprovisioned IP address of the calling CTA and enter it into the provisioning CA. This allows the provisioning CA to find the CTA and send it the certificate. At this point, the CTA is fully provisioned for its owner and will work in the provisioned state, once moved back to the HFC segment, where it is already provisioned. A verbal indication is sent as shown at 1034.

The present invention provides a method and apparatus for using a manufacturer installed certificate to authenticate a cable telephony adapter. It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A method of operating a cable telephony adapter in an IP telephony network, the method comprising:
   storing a manufacturer issued certificate in the cable telephony adapter;
   providing the manufacturer issued certificate to the telephony network;
   receiving a network issued certificate; and
   registering for telephony services with the telephony network using the network issued certificate.

2. The method of claim 1, wherein the manufacturer issued certificate includes a device identifier for the cable telephony adapter and an RSA key pair.

3. The method of claim 1, wherein the step of receiving further includes a step of storing the network issued certificate in a memory in the cable telephony adapter.

4. A cable telephony adapter for interfacing a user to a telephony network, the cable telephony adapter comprising:
   a telephony network interface having logic to couple to the telephony network;
   a user interface having logic to couple to a user device;
   a cryptographic module having logic to store a manufacturer issued certificate; and
   a processor coupled to the telephony network interface and the cryptographic module, and having logic to provide the manufacturer issued certificate to the telephony network to obtain a network issued certificate.

5. The cable telephony adapter of claim 4, further comprising a memory coupled to the processor and having logic to store the network issued certificate.

* * * * *

UNITED STATES PATENT AND TRADEMARK OFFICE
CERTIFICATE OF CORRECTION

PATENT NO. : 7,376,837 B1 Page 1 of 1
APPLICATION NO. : 10/296846
DATED : May 20, 2008
INVENTOR(S) : Medvinsky It is certified that error appears in the above-identified patent and that said Letters Patent is hereby corrected as shown below:

On the Title Page, item (56), under "OTHER PUBLICATIONS", in Column 2, Line 2, please delete "Integraded" and insert --Integrated--

Column 4, Line 58: Please delete "factory" and insert --factory.--

Column 6, Line 35: Please delete "5.2.2" and insert --5.2.2.--

Column 12, Lines 13-19: Please delete "During the testing phase,......................................time." and insert the same in Line 12 after "facility.", as a continuation.

Signed and Sealed this

Twenty-fourth Day of November, 2009

David J. Kappos
*Director of the United States Patent and Trademark Office*